(12) United States Patent
Dorfman et al.

(10) Patent No.: US 11,157,878 B2
(45) Date of Patent: Oct. 26, 2021

(54) CONTACT INFORMATION MANAGEMENT

(71) Applicant: William Michael Dorfman

(72) Inventors: William Michael Dorfman, Los Angeles, CA (US); Kurtis Frederick Heidolph, Tustin, CA (US); Shehan Raj Rajaratnam, Van Nuys, CA (US)

(*) Notice: Subject to any disclaimer, the term of this patent is extended or adjusted under 35 U.S.C. 154(b) by 68 days.

(21) Appl. No.: 16/488,630

(22) PCT Filed: Mar. 27, 2018

(86) PCT No.: PCT/US2018/024679
§ 371 (c)(1),
(2) Date: Aug. 27, 2019

(87) PCT Pub. No.: WO2018/183404
PCT Pub. Date: Oct. 4, 2018

(65) Prior Publication Data
US 2020/0051031 A1 Feb. 13, 2020

Related U.S. Application Data

(60) Provisional application No. 62/478,025, filed on Mar. 28, 2017.

(51) Int. Cl.
| | | |
|---|---|---|
| G06F 15/16 | (2006.01) |
| G06Q 10/10 | (2012.01) |
| H04M 1/2757 | (2020.01) |
| H04M 1/2746 | (2020.01) |
| H04M 1/27453 | (2020.01) |
| G06F 3/0482 | (2013.01) |
| H04L 29/08 | (2006.01) |

(52) U.S. Cl.
CPC ......... *G06Q 10/107* (2013.01); *G06F 3/0482* (2013.01); *G06Q 10/1093* (2013.01); *H04L 67/306* (2013.01); *H04M 1/2746* (2020.01); *H04M 1/2757* (2020.01); *H04M 1/27453* (2020.01)

(58) Field of Classification Search
CPC ....... H04L 47/762; H04L 51/14; H04L 51/12; H04L 51/32; H04L 67/306
USPC ................................. 709/204, 206
See application file for complete search history.

(56) References Cited

U.S. PATENT DOCUMENTS

2015/0186406 A1* 7/2015 Nadimi .................. G06Q 50/01
707/610
2015/0205842 A1* 7/2015 Jain ........................ G06F 16/215
707/732

* cited by examiner

*Primary Examiner* — Wing F Chan
*Assistant Examiner* — Andrew Woo
(74) *Attorney, Agent, or Firm* — Quan & Associates; Nancy N. Quan; Christopher Quan

(57) ABSTRACT

The present invention provides a contact management, creation, and filtering application on a mobile or computing devices by providing a contact list or address book with enhanced searching capabilities, whether the original address book or contact list is created by the application software of the present invention, with other application software while the application software of the present invention is running in the background, or the address book or contact list is being modified or sync either using the application software.

20 Claims, 4 Drawing Sheets

CONTACT INFORMATION MANAGEMENT

CROSS-REFERENCE TO RELATED APPLICATIONS

This application is a 371 national phase application of Patent Cooperation Treaty international application Ser. No. PCT/US18/24679, which claims the benefit and priority of U.S. provisional patent application Ser. No. 62/478,025, filed Mar. 28, 2017, entitled "CONTACT INFORMATION MANAGEMENT", the contents of all of which are hereby incorporated by reference in their entireties.

FIELD OF THE INVENTION

The present invention relates generally to contact management systems and, more particularly, to systems and methods for enhancing searching capability of any contact management system.

BACKGROUND OF THE INVENTION

Most people have an address book containing names, address and/or other contact information, whether the address book is used in personal, commercial or professional purposes. Traditionally, the creation of an address book or adding contacts to an existing address book may involve recording and organizing contact information manually by writing contact information into the address book or by affixing a business card or a contact entry to a record keeping system such as Rolodex®. Such traditional systems usually involve filing such contact information by organizing the contact names in alphabetical order, either by first name or last name for ease of retrieval if one remembers the name, either last name or first name of the contact one wish to search for.

In today's computer-based contact management address book, organizing contacts may employ applications that provide powerful search and retrieval capabilities and user friendly application interfaces, which make it convenient for individuals to enter contact information into their personal computers. Contact management applications are also found on portable devices including cellular telephones, hand-held computers, VoIP (Voice over Internet Protocol) telephones, and web-based applications. However, the contacts are still being stored and retrieved by name in most cases. Also, creating and storing contact information may require unique context-dependent identifiers such as telephone numbers and email addresses. A user who lacks a required identifier cannot store and share contact information on these systems. Further, context-dependent identifiers are subject to change, for example, as the user moves or changes jobs.

Even approaches such as those that create a vCard record and attach an identifier to the record do not appear to offer any means of augmenting an application such as an email application with data entry, update, synchronization or backup features or creating additional avenues for the retrieval of contact information.

Therefore, there is a need for applications to provide additional avenues for retrieval in addition to using names or e-mail addresses, as well as a need for systems that "synchronize" contact records between different contact record stores.

SUMMARY OF THE INVENTION

The present invention relates to an application software for entering basic contact information, syncing, updating, and/or adding contact names or information to a new or an existing address book or contact list and augmenting such address books or contact lists with the ability to store, manage and/or track ancillary contact information and additional searching capabilities that work off of both basic and ancillary contact information and do not involve having to remember the usual searching parameters such as a contact's name or e-mail address. There are many ways of keeping contact information created or stored in different software applications in sync. Many synchronization tools keep activity logs to assist in figuring out which repository has the most up-to-date information on any given contact as well as to allow incorrect synchronization activities to be backtracked. Such synchronization activity logs include information on when a contact entry is created and/or updated, such as by utilizing the information gathered during the synchronization process itself as a source of details by which a user can search his/her contacts. Furthermore, synchronization is both a process used to keep multiple address books in sync, as well as to keep ancillary contact information stored, managed and/or tracked by the present invention in sync with the underlying multiple address books. By using the present invention as a standalone or synchronization engine for multiple devices and/or online services, the user can use the secondary search interface provided by the present invention to search for contacts by ancillary information such as the time/place said contact information was created/updated.

When one attends meetings or activities, one may exchange contact information with those one meets or associates with. In a typical exchange, parties convey company names, personal names, job titles, telephone numbers, mailing addresses, email addresses, or even web page addresses, etc. The exchange may be done verbally or in writing, for example, exchanging business cards. The contact information may be used to create a contact list or address book, or the information may be entered into an existing contact list or address book. Various applications software may be used for such tasks. To retrieve contact information of a contact, one may need to recall the contact's name or e-mail address if there is one. If one does not recall such information, the retrieval process can be tedious. The present invention solves this problem with additional searching parameters.

For example, whether one is bad at remembering names or e-mail addresses, or that one sometimes gathers contact information from a large number of other individuals, usually within a relatively short span of time, for example at a conference or gathering, such circumstances can make it difficult to recall the names or e-mail addresses of such contacts later. It would be desirable and time saving to locate that specific individual later without tediously scanning the entire contact list or address book to find that individual. The present invention facilitates such tasks, whether the creation of the address book or contact list is accomplished with the application software of the present invention or not. If the application software of the present invention is not used to create/modify any contacts, the present invention may call to the stock application and a contact may be created/modified there in the stock application, when used, for example, on mobile devices, such as a mobile phone, a mobile reading device or a smart watch. If a contact is in the stock contact database, the present invention also does not edit this information, but makes a copy of the stock contact list when the application software of the present invention first runs, and then it "watches" the stock contact list for any changes that it then reflects in its own internal database. The internal database may include a copy of the stock contact database, status (such as new, modified, deleted, or restored), and additional ancillary information including geographic location, time/date, etc). The application software of the present invention then appends the additional data such as ancillary information in its contact database to the contact. In this manner, the ancillary information thus appended in its own database may be utilized for enhanced search criteria while using the application software of the present invention.

For instance, the device used may or may not necessarily be a mobile device. For example, it may be a desktop or a laptop computer. A different architecture may be designed to work through an online web interface for example, desktops, laptops, or other non-mobile devices.

As used herein, a stock contact application (a.k.a. stock application, OS contact list/address book, native contact list/address book, built-in contact list/address book) may be a native, built-in or OS application. A stock contact database or stock contact list that holds all the stock contacts means a contact database or contact list that holds all the contacts that is created or modified by the stock contact application or native or OS, and so on that is not the application of the present invention. The stock contact application may also be a third party application that is installed, hosted or run on the device, which may include, for example, third party address books, sales force management software, patient information management software, customer list management software and the like.

In addition, other drawbacks to existing computerized contact lists may be solved by the present invention. For example, contacts created or stored in one software applications, such as Microsoft Outlook, may not generally become transferred to contacts created or stored in another software application without additional effort, usually involving tedious work. Also, another drawback is that when sending emails to a recipient in a contact list to the recipient whose contact information is stored in multiple contact lists, the recipient may be inundated with email requests from the owner of each list to separately verify the recipient's stored contact information. This is solved by the application of the present invention.

The present invention relates to improving searching capabilities of an address book or contact list, regardless of how it is originally created or modified. In general, the present invention runs on a mobile or other device and synchronizes with at least the contact information managed by the device's built-in or stock software. The present invention provides a browsing interface for filtering or searching all of a user's contacts based on date/time entered/updated and/or physical location at time of entry/update.

In one aspect, an application software of the present invention may be utilized to collect ancillary information about or from a contact list or address book which is managed by the device built-in or native software. In general, most mobile devices such as mobile phones and tablets may utilize a built-in or native contact list or address book and may further store certain ancillary information about the entries in the contact list or address book, such as, for example, the date and/or time and/or location that the entries were created, if available, which may, without being bound to any particular theory, indicate the approximate or actual date and/or time and/or location, if available, a user encountered the subject of the entry. In particular, the application software of the present invention may be used to collect ancillary information during an initial synchronization operation (i.e. after the application software is first installed and run) and during subsequent synchronization operations.

The collected ancillary information may then be available for the application software to facilitate searching, browsing or filtering entries in the contact list or address book, such as, for example, to enable the user to search, browse or filter entries based on a time/date and/or location of an event (e.g. creation of the entry, modification of an entry, type of modification of an entry, etc.). This may be desirable to utilize the memory associations of the user rather than more traditional searching by a particular piece(s) of contact information (i.e. name, phone number, email address, address, etc.).

In general, the application software may create a record that stores the ancillary information and correlates it to the entries, such as in a synchronization log that stores the ancillary information with pointers to the appropriate entries. This may be utilized to gather available ancillary information from the new or modified entries in the contact list/address book. The record, such as the synchronization log, may be stored locally on the device, such as separately from the built-in/native contact list/address book, and/or it may be stored on a cloud or other remote storage such that it may be retained in case of loss or destruction of the device and/or for utilization by multiple devices. It may also be stored inside the built-in/native contact list/address book, in cases where the native contact list/address book exposes extensibility interfaces that permit third parties to augment contact records with custom information.

In some exemplary embodiments, the application software of the present invention may, after being first installed and run on a device, perform an operation to collect the ancillary information for the built-in or native contact list/address book and create a record that stores the ancillary information and correlates it to the entries. This may be utilized to gather available ancillary information from the existing entries in the contact list/address book. This collected ancillary information then becomes available for the user to search/browse/filter the contact list or address book in the application software.

In some embodiments, the available ancillary information from the existing entries may be limited and/or inaccurate for desired uses, so the application software may gather the ancillary information and mark or identify it as possibly inaccurate. For example, for existing entries at the time the application software is first run, ancillary information about the location where the existing entries were made may not generally be available (i.e. not normally stored information on the device) and gathering location ancillary information at the time of first running the application software may not provide an accurate representation of when the existing entries were made. The application software may thus mark such ancillary information as possibly inaccurate. This collected ancillary information then becomes available for the user to search/browse/filter the contact list or address book in the application software, and may be utilized to indicate to the user any detected inaccuracy.

In some exemplary embodiments, the application software of the present invention may after installation run at least part of the time as a background application on a device such that it may be able to receive and respond to notifications or other detections of events on the device, such as when a change to a contact list or address book occurs (e.g. new entry, modification of an entry).

In some embodiments, the API of the device's stock contact list/address book may be utilized to provide notifications to the application software when changes or new additions occur, such as when the contact list/address book is changed or modified (e.g. new entry or change to an entry)

in the stock application, such that the application software may initiate gathering of ancillary information, such as date, time and/or location. When the application software may be running in the background, it may generally attempt to capture ancillary information as close in time to the triggering event as possible to enhance the accuracy of the ancillary information for the triggering event. Background operations may have some delay, but may still generally offer relatively close-in-time capture of ancillary information as opposed to waiting until the application software is intentionally run or run on a periodic basis. The application software may incorporate rules or thresholds for the accuracy of ancillary information, such as based on the time span between the triggering event and when the application software is able to perform the synchronization/ancillary information capture. In general, the thresholds of this may be automatically or predetermined, or may also be set by the user. This collected ancillary information, which may include annotations or marks regarding the accuracy of the information, then becomes available for the user to search/browse/filter the contact list or address book in the application software.

In another aspect, the application software of the present invention may be utilized directly or run actively in parallel with the device's stock contact list/address book application. In general, the actively running application software may capture ancillary information at the time of a change or modification or with an insignificant/negligible delay. The collected ancillary information may then be available for the application software to facilitate searching, browsing or filtering entries in the contact list or address book, such as, for example, to enable the user to search, browse or filter entries based on a time/date and/or location of an event (e.g. creation of the entry, modification of an entry, type of modification of an entry, etc.).

In some exemplary embodiments, the application software may be utilized to create or modify an entry in the contact list/address book rather than the stock application, such that the application software can immediately capture ancillary information such as time/date/location when the change is made, resulting in very accurate ancillary information relative to the change. This collected ancillary information then becomes available for the user to search/browse/filter the contact list or address book in the application software. For example, the user may initiate a modification or new entry in the application software, which may, for example, launch or open the stock application to perform the modification or new entry, during which the application software may still be actively running and able to detect the change immediately after it is complete (e.g. by notification from the stock application) or it may cause the application software to return to the foreground immediately after the change is made and then immediately attempt to capture ancillary information rather than waiting for a notification or detection.

In some other embodiments, the application software may run actively in parallel with the stock application so that there is little to no delay between the notification or detection of a change and the capture of ancillary information by the application software. This may generally collect very accurate ancillary information due to the closeness in time. This collected ancillary information then becomes available for the user to search/browse/filter the contact list or address book in the application software.

In another aspect of the present invention, the application software may be adapted to aid in the recovery of lost or deleted information, such as lost or deleted contact entries in an OS contact list. In some embodiments, the software application may periodically and/or upon prompting by the user backup the OS contact list with all of the information contained or selected portions, such as name and essential contact information (e.g. phone number, email address, etc.). The backup may also be stored remotely, such as on a cloud or other remote storage service, such that it may not be subject to loss due to loss or destruction of the device. The application software may, as described above, detect modification events from the stock application, such as the deletion of a contact entry, and may reflect in the synchronization log that a contact entry is deleted such that the backup contact entry may be retained for future recovery. The application software may be further utilized to search or display deleted entries.

In some embodiments, the device's built-in or native contact list/address book may not be able or configured to provide notifications of changes, so the software application may also employ periodic or scheduled polling of the device's built-in or native contact list/address book to detect changes at time intervals where notifications are not available.

The application software of the present invention may enhance searching capabilities to different degrees under different situations.

In one aspect, when the application software of the present invention may be used to create the contact information or contact list and/or augment contact information with ancillary information, or it may be simply running in the background while the contact list or information is being created and/or augmented using other application software, the searching capability for the address book or contact list may be enhanced to search ancillary information such as time or date of creating and/or augmenting the contact and/or the geographical location when such contact information is created so that locating the contact may be accomplished without having to remember the name or e-mail address of the contact.

In one embodiment, when the address book or contact list is created and/or augmented with ancillary information using the application software of the present invention, the software of the present invention collects ancillary information such as the physical location of the device when the present invention detects that a contact entry has been created and/or augmented and associates the ancillary time/date and/or physical location with the log entry for the creation and/or augmentation of that contact entry, storing/tracking it as a piece of ancillary contact information. The present invention may be running, for example, on a mobile device and synchronization may be effected with at least a copy of the contact information managed by the mobile device's native or built-in software. The ancillary information becomes searchable for the address book or contact list so created and/or augmented.

In another embodiment, when the address book or contact list is created and/or augmented by any other software application while the application software of the present invention is running in the background, for example, on a mobile device and synchronization may be effected with at least the contact information managed by the mobile device's built-in software, the software of the present invention collects ancillary information such as the physical location of the device when the present invention detects that a contact entry has been created and/or augmented and associates the ancillary time/date and/or physical location with the log entry for the creation and/or augmentation of that contact entry, storing/tracking it as a piece of ancillary contact information. For example, the application software of the present invention collects information from existing contacts or stock contact list. The date and time of creation or last backup of device may be pulled. Whichever is later as this information is stored by the, for example, phone OS is the information collected. An internal database is generated for the application of the present invention to use for future updates of date, time, location, and other contact details. The ancillary information becomes searchable for the address book or contact list so created and/or augmented.

In another aspect, when the application software is not used and is not running in the background when one or more contact or address book entries are created and/or augmented using other application software, the searching capabilities may be enhanced to include time or date when creating and/or augmenting the contact information without having to remember the name or e-mail address of the contact.

In one embodiment, the enhanced searching capability provided by the application software of the present invention may be added when the native address book or contact list is modified and the application software of the present invention is used for the modification. The present invention may be running, for example, on a mobile device and synchronization may be effected with at least the contact information managed by the mobile device's built-in software. The software of the present invention collects the physical location of the device when the present invention detects that a contact entry has been created and/or augmented and associates ancillary information such as the time/date with the synchronization log entry for the creation and/or augmentation of that contact entry, storing/tracking it as a piece of ancillary contact information. The date and/or time of the contact list or address book creation or latest update to any contact prior to the current update becomes the searchable date and/or time. For example, when editing contact information in the native contact list with the application software of the present invention, the location information is updated when the contact is modified or updated. The physical location of the editing may become searchable, even though the original physical location when the contact was originally created may not be searchable in this instance.

In another embodiment, the enhanced searching capability provided by the application software of the present invention may be added when the address book or contact list is modified and the software application of the present invention is running in the background during the modification. The present invention may be running during modification in the background, for example, on a mobile device and synchronization may be effected with at least the contact information managed by the mobile device's built-in software. The software of the present invention collects the physical location of the device when the present invention detects that a contact entry has been created and/or augmented and associates ancillary information such as the time/date with the synchronization log entry for the creation and/or augmentation of that contact entry, storing/tracking it as a piece of ancillary contact information. The date and/or time of the contact list or address book creation or latest update to any contact prior to the current update becomes a searchable date and/or time. For example, when editing contact information in the native contact list with the application software of the present invention running in the background, the location information is updated when the contact is updated. As the application software of the present invention is running in the background, if the user gives the permission for the application software to access location information, the location is updated in background and the edited contact would be associated with accurate location information when the contact was modified. The physical location of the editing may be searchable, but the original physical location when the contact was created and/or augmented may not be searchable in this instance.

In a further embodiment, the enhanced searching capability provided by the application software of the present invention may be added by simply copying the address book or contact list to create a second address book or contact list using the application software of the present invention. The present invention may be running, for example, on a mobile device and synchronization may be effected with at least the contact information managed by the mobile device's built-in software. The software of the present invention collects the physical location of the device when the present invention detects that a contact entry has been created and/or augmented and associates ancillary information such as the time/date with the synchronization log entry for the creation and/or augmentation of that contact entry, storing/tracking it as a piece of ancillary contact information. The date and/or time of the contact list or address book creation or latest update to any contact prior to the current copying becomes the searchable date and/or time. Here, the location information is updated when the contact is updated. The physical location of the editing may become searchable, but the original physical location when the contact was created and/or augmented may not be searchable in this instance.

In yet another embodiment, the enhanced searching capability provided by the application software of the present invention may be added when the address book or contact list is copied to create a new address book or contact list when the software application of the present invention is running in the background. The present invention may be running, for example, on a mobile device and synchronization may be effected with at least the contact information managed by the mobile device's built-in software. The software of the present invention collects ancillary information such as the physical location of the device when the present invention detects that a contact entry has been created and/or augmented and associates the time/date with the log entry for the creation and/or augmentation of that contact entry, storing/tracking it as a piece of ancillary contact information. The date and/or time of the contact list or address book creation and/or latest update to any contact prior to the copying become searchable dates and/or times. As the application software of the present invention is running in the background, if the user gives the permission for the application software to access location information, the location updates in background and the edited contact would be associated with accurate location information when the contact was modified. The physical location of the editing may be searchable, but the original physical location when the contact was created and/or augmented may not be searchable in this instance.

In another exemplary embodiment, the present invention facilitates modification and syncing of contacts and contact information after address books or contact lists belonging to an individual are created, whether created by the application software of the present invention, having the application software of the present invention running in the background during creation, or later during modification, no matter whether the information is on how many different devices or how many different applications are used to create the information, the date and/or time of the contact lists or address books creation or the latest updates to any contact prior to the current syncing becomes the searchable date and/or time. The present invention provides a browsing interface for filtering all of a user's contacts based on date/time entered/updated and/or physical location at time of entry/update.

There are a large number of contact management applications available for personal and business use which individuals may utilize. One may have more than one device and more than one contact management application to store and maintain their contact list or address book. For example, one may use one system on a personal computer and another system on a mobile device. In addition, many businesses, for example, may also employ enterprise resource planning systems, customer relationship management systems, sales force automation systems, patient information management systems, and other systems having contact management functionality. To sync contact and/or other information an individual has collected, some general techniques may involve copying a contact record from one device and adding it to another device. If the devices have the same record, these systems compare the records to find the most up-to-date version. If the solution cannot determine the most recent version, it typically presents a "conflict resolution" interface to the user, or provides a default setting that enables one system's record to prevail. As one attempts to synchronize more than two devices, the number of records to compare increases and more time and effort will be expanded. When synchronization solutions attempt to retrieve data from applications behind corporate firewalls, the firewalls may undermine the synchronization solution by blocking inbound network requests. Additionally, for wireless communication devices, the uploading of data from these devices may also present significant issues. Some synchronization systems also may have a tendency to create duplicate records. Some solutions may couple synchronization solutions to electronic address book backup solutions, etc. While, as noted above, these and other solutions are all time consuming and inefficient and at the same time, do not add capabilities to searching once the syncing is done, which capabilities are provided by the application software of the present invention. The present invention is capable of enhancing the searching capabilities of the updated and synced information in the address books and contact lists. At the same time, the application software of the present invention automatically syncs all the various address books and contact lists once information is entered into one address book or contact list.

In one embodiment, when the syncing is performed with the application software of the present invention and the address books or contact lists are created by and/or augmented with ancillary information storage capabilities by the application software of the present invention, the software of the present invention collects the physical location of the device when the present invention detects that a contact entry has been created and/or augmented and associates ancillary information such as the time/date and/or physical location with the log entry for the creation and/or augmentation of that contact entry, storing/tracking it as a piece of ancillary contact information. The present invention may be running, for example, on a mobile device. The synced address books or contact lists preserves and retain the searching capabilities of the originally created address books or contact lists, for example, time and/or date and geographical location.

In another embodiment, when the syncing is performed with other application software, with the application software of the present invention running in the background, and the address books or contact lists are created and/or augmented by the application software of the present invention, the software of the present invention collects the physical location of the device when the present invention detects that a contact entry has been created and/or augmented and associates ancillary information such as the physical location and/or time/date with the log entry for the creation and/or augmentation of that contact entry, storing/tracking it as a piece of ancillary contact information. The present invention may be running, for example, on a mobile device. The synced address books or contact lists retain the searching capabilities of the originally created address books or contact lists, for example, time and/or date.

In a further embodiment, when the syncing is performed with other application software while the application software of the present invention running in the background, and the stock address books or contact lists are created and/or augmented by other software applications also while the application software of the present invention running in the background, the software of the present invention makes a copy of the stock contact list, collects ancillary information such as the physical location of the device when the present invention detects that a contact entry has been created and/or augmented and associates the time/date with the log entry for the creation and/or augmentation of that contact entry, storing/tracking it as a piece of ancillary contact information in its internal database. The present invention may be running, for example, on a mobile device and synchronization may be effected with at least the contact information managed by the mobile device's built-in software. The synced address books or contact lists retain the searching capabilities of the originally created address books or contact lists, for example, time and/or date and geographical location.

In yet another embodiment, when the syncing is performed with other application software while the application software of the present invention running in the background, and the address books or contact lists are created and/or augmented by other software applications without the application software of the present invention running in the background, the software of the present invention collects ancillary information such as the physical location of the device when the present invention detects that a contact entry has been created and/or augmented and associates the time/date with the log entry for the creation and/or augmentation of that contact entry, storing/tracking it as a piece of ancillary contact information. The synced address books or contact lists retain the searching capabilities of the originally created address books or contact lists, for example, time and/or date. The present invention may be running, for example, on a mobile device and synchronization may be effected with at least the contact information managed by the mobile device's built-in software.

In a further exemplary embodiment, the present invention facilitates the modification and syncing of contact list or addresses books of multiple individuals belonging to an organization or group once information is entered into one contact list or address book, while at the same time creating enhanced searching capabilities. The present invention provides a browsing interface for filtering all of a user's contacts based on date/time entered/updated and/or physical location at time of entry/update.

Many organizations, as noted above, may employ enterprise resource planning systems, customer relationship management systems, sales force automation systems, patient information management systems and other systems having contact management functionality. During a typical tradeshow or conference, when there is more than one attendee from the same company or organization, different contact lists may result. These attendees may wish to share their contacts with others in the company or organization. The present invention provides an easy and efficient way for syncing and sharing of contact information with enhanced searching capabilities.

In one embodiment, when the contact lists or address books from the different individuals are created and/or augmented using the application software of the present invention, and the information is being modified and/or synced also using the application software of the present invention, the software of the present invention collects ancillary information such as the physical location of the device when the present invention detects that a contact entry has been created and/or augmented and associates the physical location and/or time/date with the synchronization log entry for the creation and/or augmentation of that contact entry, storing/tracking it as a piece of ancillary contact information. The present invention may be running, for example, on a mobile device and synchronization may be effected with at least the contact information managed by the mobile device's built-in software. The modified and/or synced information retains the enhanced searching capability of the originally created information, for example, time and/or date or geographical location of creation. Also, once syncing is done to one device or one address book or contact list, all the other devices and address books will be done automatically without additional effort.

In another embodiment, when the contact lists or address books from the different individuals are created and/or augmented using other application software, or different application software, while the application software of the present invention running in the background, and the information is being synced or modified using the application software of the present invention, the software of the present invention collects ancillary information such as the physical location of the device when the present invention detects that a contact entry has been created and/or augmented and associates the physical location and/or time/date with the synchronization log entry for the creation and/or augmentation of that contact entry, storing/tracking it as a piece of ancillary contact information. The present invention may be running, for example, on a mobile device. The synced or information retains the enhanced searching capability of the originally created information. Also, once syncing is done to one device or one address book, all the other devices without additional effort.

In a further embodiment, when the contact lists or address books from the different individuals are created and/or augmented using other application software, or different application software, without the software application of the present invention running in the background, and the modification and syncing is done using the application software of the present invention, the software of the present invention collects ancillary information such as the physical location of the device when the present invention detects that a contact entry has been created and/or augmented and associates the physical location and/or time/date with the synchronization log entry for the creation and/or augmentation of that contact entry, storing/tracking it as a piece of ancillary contact information. The present invention may be running, for example, on a mobile device. The synced information adds enhanced searching capability of the originally created information, for example, time and/or date of the latest update. Also, once syncing is done to one device or one address book, all the other devices.

In yet another exemplary embodiment, the present invention may include an interface for retrieving contact information utilizing ancillary information which may appear embedded inside another application via for example that application's exposed plug-in extensibility mechanism. In this way, the improved retrieval methods of the above described embodiments of the present invention may be leveraged by other applications that have an incidental need to retrieve contact information. In one embodiment, for example, a text messaging application may be extended to allow chat participants to be chosen via the present invention's interface, allowing users to leverage ancillary information to retrieve contacts. In another embodiment, a banking application may be extended to allow an account holder to choose a recipient for a money transfer via the present invention's interface. In yet another embodiment, a calendaring application may be extended to allow someone scheduling a meeting to choose participants via the present invention's interface.

In yet a further exemplary embodiment, the present invention may facilitate the recovery of a deleted contact. A user may delete a contact from the stock contact list so that the contact is no longer visible in the stock OS contact list. The application software of the present invention detects the contact deletion and marks that contact as deleted in its internal contact list. A user may afterwards go to application software of the present invention to select deleted contacts in its internal contact lists and see a list of all deleted contacts. The deleted contact may be restored in the internal contact list if the user wishes. In one aspect, the restoration may be done on one deleted contact. In another aspect, the restoration may be performed on multiple contacts at once. The ancillary information may be associated with the restored contact so that the enhanced searching capability is also restored. After the restoration process is completed, the restored contact may be copied into the stock contact list so that the contact may now be seen in the stock contact list.

In yet another further exemplary embodiment, the present invention relates to a method for managing an augmented contact list on a device, including detecting with a software application installed on a device a change in an operating system contact list of the device; identifying a type of change and an associated contact entry of said operating system contact list from the change; gathering ancillary information from said device within a timeframe of the change; storing said ancillary information in a record maintained by said software application separately from said operating system contact list, the ancillary information being associated with the associated contact entry by a pointer in said record; providing a query accepting mechanism in said software application for searching the ancillary information and returning an identity of the associated contact entry.

The augmented contact may be maintained in various manners. In one aspect, the augmented contact list may be stored within a personal device's built-in contact list via the built-in contact list's extensibility features. In another aspect, the augmented contact list may be stored by a separate application running on a personal device.

The augmented contact list is stored on one or more remote servers. For example, the augmented contact list may be stored within one or more contact list services' data stores on one or more remote servers via said contact list services' built-in extensibility features.

In one embodiment, the augmented contact list may store a copy of the original contact list. The original contact list may be the built-in contact list on a personal device. The original contact list may be a customer relationship management, a social networking list, and/or patient information management application or service.

In another embodiment, the augmented contact list may serve as a backup for the original contact list.

In a further embodiment, the augmented contact list may be used to support undoing of changes and/or undeleting of contact entries for the original contact list.

In yet another embodiment, the augmented contact entry may be enhanced by the user with more meaningful and/or specific information than that captured automatically.

In one aspect, the triggering event for the creation and/or update of an augmented contact entry may be a notification from the original contact list. In another aspect, the triggering event for the creation and/or update of an augmented contact entry may be the detection of a potential change during regular polling of the original contact list. In a further aspect, the triggering event for the creation and/or update of an augmented contact entry may be a synchronization with one or more other augmented contact lists running on the same or different devices.

In all of the exemplary embodiments described herein, the present invention allows ancillary information to be updated manually by the user to clarify/correct, for example, the physical location associated with the creation/update of a contact entry. In addition, after a contact creation and/or augmentation, the location may be modified the location can be modified manually to be more precise if desired. For example, the application software of the present invention may be associated with, for example, Yelp, so when a contact is created and/or augmented, instead of just getting coordinates or a nearby address, one may associate it with a specific venue, store, restaurant, or other for an easier recall in the future. In one aspect, a user may be able to modify manually a location with added information such as nearby popular location information via, such as, Google. In another aspect, in instances where may not be able to get location information, the user may still be able to add location information manually to keep in the record, where location was added/modified. In yet another aspect, a user may specify that ancillary information may be used to populate a specific field of the contact entry. For example, the date of creation of the contact entry may be that contact's wedding, and the user can indicate to save the date not only as ancillary information but also as that contact's anniversary date. The user may also add additional ancillary information, such as, for example, photos, notations, notes, nicknames, relations, metadata from photos or other files (e.g. location/time where created or taken metadata), etc.

The present invention further relates to a retrieval of contact information to occur not just via explicit inputting of additional searching parameters, as already indicated, but also by association with the user's present circumstances. In one embodiment, for example, time or date information captured as ancillary information may indicate an event such as a yearly conference or a friend's birthday, or anniversary. On the same date in a future year, contact information may be retrieved automatically and presented to the user. In another embodiment, for example, place information captured as ancillary information may indicate a client's place of work. When the user returns to the same or nearby physical place in the future, contact information may be retrieved automatically and presented to the user. The retrieval interface may be embedded directly within one or more of the original contact list's applications.

The interaction of the application software with the user may be performed via a touchscreen, a keyboard, a mouse, and/or a speech interface. The interaction with the user may be embedded and/or performed from within another application, such as a text messaging, calendaring, or banking application, that has an incidental use for contact information retrieval.

An augmented contact entry may be manually associated or re-associated with a specific contact entry from the original contact list. In one aspect, the user may update the original contact entry using information from the retrieved augmented contact entry. In one embodiment, the user may use a date of creation or access for the augmented contact entry as the date for a major event in the contact entry, such as a birthday or anniversary. In another embodiment, the user may use a location of creation or access for the augmented contact entry as the location detail in the contact entry, such as a place of residence or work. In another aspect, the user may select one or more augmented contact entries to be consolidated into a single entry. In a further aspect, the user may perform operations on multiple augmented contact entries at once, such as viewing on a map or timeline, starting a conference call, or sending of a group text message.

The contact information may be displayed to the user on any personal device of the user. Such information may be displayed and presented and to the user when the personal device is brought into a similar context as that captured within that contact's augmented contact entry, or a triggering context. In one aspect, triggering context may be a physical location, for example, a place of residence, or work. In another aspect, the triggering context may be an ongoing event, for example, a birthday or anniversary. The presentation of contact information further augments the augmented contact entry with information regarding that act of presentation.

In some embodiments, after a user has been presented with one or more contacts as the result of a retrieval operation, the application software of the present invention may provide users with the ability to perform actions on these contacts, such as initiate a conference call with these contacts, start a group chat with these contacts, etc. The application software may also allow these contacts to be displayed together in a useful way, such as in a list, as a timeline (arranged by for example date of creation), as a map (arranged by for example place the user was at during the creation of the contact entry), etc. The application software may also allow these contacts to be merged together into a single contact entry, to support situations where duplicate and/or redundant contact entries exist for a single contact.

In some embodiments, the user is allowed to fix an incorrect association between an augmented contact entry and a contact entry in the built-in address book. In cases where automatic synchronization results in ancillary information being associated with the wrong contact, this functionality allows the user to redirect augmented contact information to point to the correct contact entry in the built-in address book.

Other objects, features and advantages of the invention should be apparent from the following description of a preferred embodiment thereof as illustrated in the accompanying drawings.

DETAILED DESCRIPTION OF THE INVENTION

Figure 1:
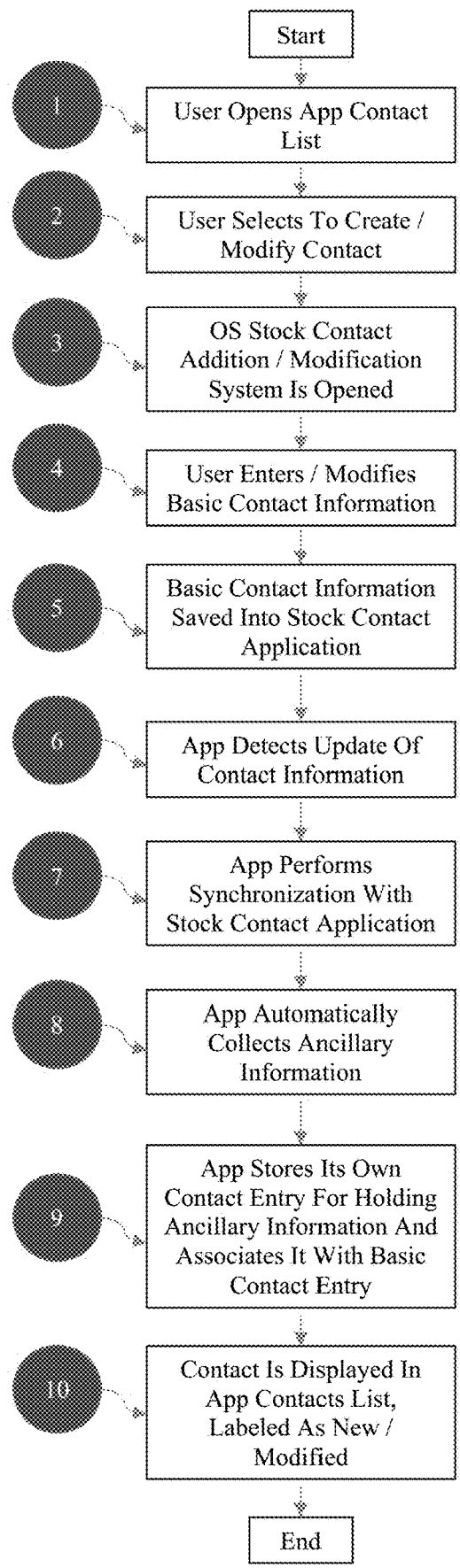
FIG. 1 depicts a flow chart for creating a new contact or modifying an existing contact using the software application of the present invention.

The detailed description set forth below is intended as a description of the presently exemplified systems, devices and methods provided in accordance with aspects of the present invention and are not intended to represent the only forms in which the present invention may be prepared or utilized. It is to be understood, rather, that the same or equivalent functions and components may be accomplished by different embodiments that are also intended to be encompassed within the spirit and scope of the invention. Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the exemplary methods, devices and materials are now described. All publications mentioned herein are incorporated herein by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

The present invention relates to an enhanced contact application which includes ancillary information such as geographic location, time/date information, etc. With the present invention, one may not need to worry about losing or deleting that business contact or special friend's number again. One may actually say goodbye to backup apps that may or may not function well. The present invention changes the way one organizes, uses and saves one's contacts.

Contacts may be obtained under various situations. When one attends meetings or activities, one may exchange contact information with those one meets or associates with. In a typical exchange, parties convey company names, personal names, job titles, telephone numbers, mailing addresses, email addresses, or even web page addresses, etc. The exchange may be done verbally or in writing, for example, exchanging business cards. There are a large number of contact management applications available for personal and business use, and individuals regularly utilize more than one contact management application to store and maintain their contact information. For example, one may use one system on a personal computer and another system on a mobile device. In addition, many businesses, for example, may employ enterprise resource planning systems, customer relationship management systems, sales force automation systems and other systems having contact management functionality.

People depend on contact information to keep track of friends, colleagues, customers, and other people of acquaintance. To improve the convenience of looking up contact information, this contact information is often recorded on various devices and using various online services. As a result, multiple copies of the same or similar contact information ends up existing in multiple places at once.

There are many ways of keeping these repositories of contact information in sync. Many synchronization tools keep activity logs to assist in figuring out which repository has the most up-to-date information on any given contact as well as to allow incorrect synchronization activities to be backtracked. Such activity logs include information on when a contact entry is created and/or updated.

Entering the same contact information into multiple contact management applications requires a time-consuming and redundant manual data entry process. The high costs associated with manual data entry are well-understood, and many prior art systems have been designed to address these concerns. For example, creating an electronic backup file of a contact information database enables contact data to be automatically restored to a contact management application if the application's database becomes corrupt. Backup files also enable data from one application to be imported into another application, provided the file formats are compatible or translation from one format to another is feasible.

There are systems designed to minimize the burden of manually entering contact information through use of specialized hardware and software. For example, a business card scanner may be used to scan the characters on a printed business card, and specialized Optical Character Recognition (OCR) software attempts to identify the scanned characters and assign the identified characters to appropriate data fields in a contact management application. These scanning systems may or may not be compatible with personal computers and small computing devices such as personal digital assistants (PDAs), handheld computers, and cellular telephones.

Human memory is associative, and users often rely on the one or more details by which a user can recall a specific contact to attempt to retrieve contact information. Most contact information management solutions only allow contacts to be found based on common details such as name, address, etc. Sometimes, the time and place where the activities of recording and updating contact information itself are the details that a user associates with a contact whose information the user is trying to retrieve.

In addition, to search for the contact after creation of address books or contact lists requires one to remember either the contact's name or e-mail address. If one does not recall such name or e-mail address, one will need to manually going through the book or list, which is time consuming. The present invention enhancing the contact searching capability of the address book or contact list to facilitate searching. For example, one can search for the contact by time and/or date and even geographical location where such contact information is created/updated.

The present invention relates to a software application with the ability to store, manage and/or track ancillary contact information and additional searching capabilities that work off of both basic and ancillary contact information and do not involve having to remember the usual searching parameters such as a contact's name or e-mail address. The word synchronization as used herein represents both a process used to keep multiple address books in sync as well as to keep ancillary contact information stored, managed and/or tracked by the present invention in sync with the underlying multiple address books. By using the present invention as a standalone or synchronization engine for multiple devices and/or online services, the user can use the secondary search interface provided by the present invention to search for contacts by ancillary information such as the time/place said contact information was created/updated.

As mentioned above, using the application software of the present invention to retrieve contact information of a contact, one may not need to recall the contact's name or e-mail address if there is one. The present invention solves this problem with additional searching parameters, such as time or date or place of the contact creation or modification. The present invention facilitates such searching tasks, whether the creation of the address book or contact list is accomplished with the application software of the present invention or not.

In some embodiments, as noted before, the retrieval of contact information may occur not just via explicit inputting of additional searching parameters but also by association with the user's present circumstances. For example, time or date information captured as ancillary information may indicate an event such as a yearly conference or a friend's birthday. On the same date in a future year, contact information may be retrieved automatically and presented to the user. Similarly, place information captured as ancillary information may indicate a client's place of work. When the user returns to the same physical place in the future, contact information may be retrieved automatically and presented to the user.

The device used may or may not necessarily be a mobile device. For example, it may be a desktop computing desk or a laptop computer. For another example, it may be a mobile phone, a mobile reading device or a smart watch. The device may also use one or more modes of input, including touchscreens, keyboards, mice, speech synthesis, etc. In general, the device may include features to provide date/time information and/or location information, such as through GPS, cellular or wireless network location services and/or any other appropriate location finding mechanism.

In one aspect of the present invention, a software application, such as an application for a mobile or other device, may be utilized to collect ancillary information about or from a contact list or address book which is managed by the device built-in or native software. In general, most mobile devices such as mobile phones and tablets may utilize a built-in or native contact list or address book and may further store certain ancillary information about the entries in the contact list or address book, such as, for example, the date and/or time and/or location that the entries were created/updated, if available, which may, without being bound to any particular theory, indicate the approximate or actual date and/or time and/or location, if available, a user encountered the subject of the entry. In some exemplary embodiments, the software application of the present invention may, after being first installed and run on a device, perform an operation to collect the ancillary information for the built-in or native contact list/address book and create a record that stores the ancillary information and correlates it to the entries, such as in a synchronization log that stores the ancillary information with pointers to the appropriate entries. This may be utilized to gather available ancillary information from the existing entries in the contact list/address book.

In another aspect of the present invention, the software application may be utilized to gather ancillary information for new or changed entries in a contact list/address book. In some embodiments, the API of the device's built-in or native contact list/address book may be utilized to provide notifications to the software application when changes or new additions occur, such that the software application may initiate gathering of ancillary information, such as date, time and/or location. In general, the software application may be running actively during the notification, in the background, or within a short time after the notification such that it may capture ancillary information as near in time to the event generating the notification occurs. In some exemplary embodiments, the software application may create a record that stores the ancillary information and correlates it to the entries, such as in a synchronization log that stores the ancillary information with pointers to the appropriate entries. This may be utilized to gather available ancillary information from the new or modified entries in the contact list/address book. The record, such as the synchronization log, may be stored locally on the device, such as separately from the built-in/native contact list/address book, and/or it may be stored on a cloud or other remote storage such that it may be retained in case of loss or destruction of the device and/or for utilization by multiple devices. In some embodiments, the device's built-in or native contact list/address book may not be able or configured to provide notifications of changes, so the software application may also employ periodic or scheduled polling of the device's built-in or native contact list/address book to detect changes at time intervals where notifications are not available.

In some embodiments, the gathering of ancillary information from the contact list/address book changes or new entries may be triggered by the user initiating a modifying action in the software application, such as by initiating creation of a new contact entry or modifying an existing contact entry. FIG. 1 illustrates a flow chart for creating or modifying an entry in a contact list/address book utilizing the user interface (UI) of the software application. The software application of the present invention may run on a device, for example, a mobile device and synchronizes with at least the contact information managed by the mobile device's built-in software. When the user selects to open the contact list (as indicated by step 1) to create a new contact entry or modify an existing contact entry (as indicated by step 2), the user enters basic contact information into the device, such as through the software application initializing the OS contact list (as indicted by step 3). The user may then enter or change information in the OS contact list (as indicated in step 4), which may then be saved in to the OS contact list (as indicated in step 5). After the modification is made, the software application may detect the modification (as indicated in step 6), such as by, for example, from the OS contact list which may generate a notification for the software application (e.g. the software application may be registered to receive such notifications) or through polling the OS contact list at regular or scheduled intervals. The software application may then perform a synchronization with the OS contact list to detect what changes occurred, such as the modification of an existing contact or the creation of a new one (as indicated in step 7). For the modifications or new entries, the software application may be updated with the modification and may also trigger the collection of ancillary information, such as the date/time and/or location of the device (as indicated in step 8), which may be stored in the synchronization log of software application in association with the modification event and pointed to the appropriate entry in the OS contact list (as indicated in step 9). Finally, the user may be presented with the new or modified contact entry in step 10 in the software application. At a later time, if the user searches for the new or modified contact in the software application, it may provide a browsing interface for filtering all of a user's contacts based on parameters including the date/time and/or location when the new contact was created or when a given modification occurred to an existing entry, as described further below. This may be desirable for the user to recall a contact without remembering a name, phone number or other specific contact detail (e.g. address, email address, handles, etc.), as the contact may be found through sorting or searching based on date/time and/or location the contact was created or when the contact was modified (e.g. when a significant piece of information was added or changed).

In general, since the creation or modification of a contact entry is initiated and/or performed through user interaction with the software application, the captured ancillary information, such as the date/time and/or location, may generally be captured at or very close in time to the actual time of the creation or modification of a contact entry. This may be desirable to as closely match the record in the synchronization log to the memory association of the user.

Figure 2:
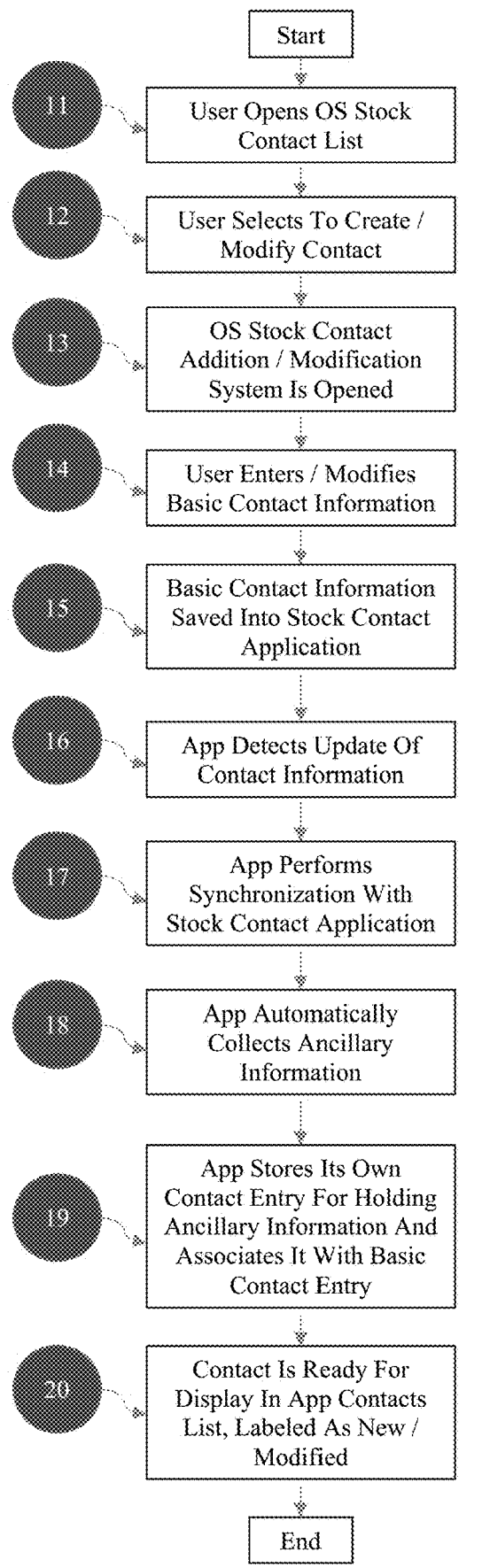
FIG. 2 depicts a flow chart for creating or modifying contact entries when the software application of the present invention is running in the background.

In some embodiments, the gathering of ancillary information from the contact list/address book changes or new entries may be triggered by the user initiating a modifying action outside of the software application, such as by initiating creation of a new contact entry or modifying an existing contact entry in the built-in or native contact list/address book without accessing the software application directly. FIG. 2 illustrates a flow chart for creating or modifying an entry in a contact list/address book utilizing the user interface (UI) of the built-in or native contact list/address book (e.g. the OS contact list). The software application of the present invention may run on a device, for example, a mobile device and synchronizes with at least the contact information managed by the mobile device's built-in software. In some embodiments, the software application may be run in the background during operation of the device, such as during the operation of other applications or without direct actions by the user. When the user selects to open the OS contact list (as indicated by step 11) to create a new contact entry or modify an existing contact entry (as indicated by step 12), the user enters basic contact information into the device, such as through the OS contact list (as indicted by step 13). The user may then enter or change information in the OS contact list (as indicated in step 14), which may then be saved in to the OS contact list (as indicated in step 15). After the modification is made, the software application may detect the modification (as indicated in step 16), such as by, for example, from the OS contact list which may generate a notification for the software application (e.g. the software application may be registered to receive such notifications) or by polling the OS contact list at regular or scheduled intervals. The software application may then perform a synchronization with the OS contact list to detect what changes occurred, such as the modification of an existing contact or the creation of a new one (as indicated in step 17). In general, background running applications such as the software application may perform tasks only when allowed by the operating system of the device, and as such may not have as an immediate performance of tasks, such as performing the synchronization of step 17, as if the software application was being utilized directly by the user rather than in the background. However, in general, the background running may still perform tasks in a relatively close span of time to the actual time of the creation or modification of the contact entry in the OS contact list. For the modifications or new entries, the software application may be updated with the modification and may also trigger the collection of ancillary information, such as the date/time and/or location of the device (as indicated in step 18), which may be stored in the synchronization log of the software application in association with the modification event and pointed to the appropriate entry in the OS contact list (as indicated in step 19). The software application may be configured to attempt such gathering of ancillary information as quickly as possible while running in the background so as to as closely match the actual time of the creation or modification of a contact entry as possible. This may include, for example, configuring the software application to represent a prioritized background application for the device OS such that its tasks are not delayed to a great degree. This may be desirable for gathering location ancillary information, for example, since users of mobile devices may be in transit or otherwise changing location during the course of adding or modifying contact entries and too great a delay in collecting location ancillary information may result in an excessively inaccurate record in the synchronization log. Finally, the user may be presented with the new or modified contact entry in step 20 in the software application when it is accessed later. The user may then search for the new or modified contact in the software application, which may provide a browsing interface for filtering all of a user's contacts based on parameters including the date/time and/or location when the new contact was created or when a given modification occurred to an existing entry, as described further below. This may be desirable for the user to utilize the OS contact list and to later recall a contact without remembering a name, phone number or other specific contact detail (e.g. address, email address, handles, etc.), as the contact may be found through sorting or searching based on date/time and/or location the contact was created or when the contact was modified (e.g. when a significant piece of information was added or changed).

In general, if the software application is not running in the background constantly and/or if the operations of the software application to gather ancillary information are delayed, some of such ancillary information may not be available and/or inaccurate information may be gathered. However, if any ancillary information is available when the software application attempts to gather ancillary information, such as the next time the software application runs, it may update its record at such a given time. However, if some ancillary information is not available to be collected from the time of a creation or modification, such as location ancillary information, the software application may update with the current location ancillary information at the time it runs if the intervening time span is not too great, or it may not record location if the intervening time is too great. In general, the thresholds of this may be automatically or predetermined, or may also be set by the user.

In another aspect of the present invention, the software application may be adapted to aid in the recovery of lost or deleted information, such as lost or deleted contact entries in an OS contact list. In some embodiments, the software application may periodically and/or upon prompting by the user backup the OS contact list with all of the information contained or selected portions, such as name and essential contact information (e.g. phone number, email address, etc.).

This may be stored separately by the software application from the OS contact list and/or the software application's synchronization log. Further, the pointers in the synchronization log may be modified to point to the appropriate contact entries in the backup in addition to pointing to the contact entries in the OS contact list. The backup may also be stored remotely, such as on a cloud or other remote storage service, such that it may not be subject to loss due to loss or destruction of the device. The software application may, as described above, detect modification events from the OS contact list, such as the deletion of a contact entry, and may reflect in the synchronization log that a contact entry is deleted such that the backup contact entry may be retained for future recovery.

Figure 3:
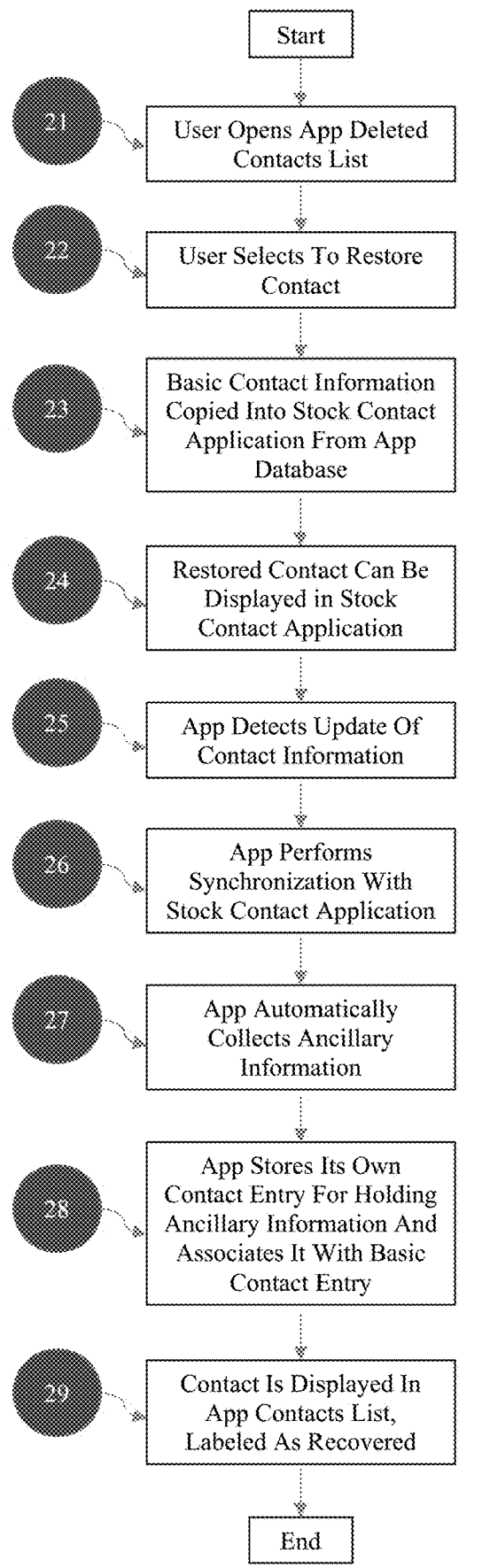
FIG. 3 depicts a flow chart for recovering deleted contact entries with the software application of the present invention.

FIG. 3 illustrates a flow chart of an operation of the software application of the present invention to recover a deleted contact entry. At the start, the user may open the software application deleted contacts list at step 21 to look for a deleted contact entry, such as one which is no longer present in the OS contact list. Once found, the user may select the contact entry to restore at step 22. The retained contact information for the deleted contact entry may be restored from the software application's synchronization log and/or a backup copy of the contact list by searching for the appropriate references (e.g. unique ID, name, phone number, etc.) to retrieve the proper information from the backup copy, and the contact information may then be copied back into the OS contact list (as shown at step 23). Subsequently, the OS contact list may again display the restored contact entry (as shown at step 24). This may further generate a notification or otherwise be detected by the software application as a modification event, such as by polling the OS contact list at regular or scheduled intervals (as shown at step 25). The software application may then perform a synchronization with the OS contact list to detect what changes occurred, such as the detection of a new contact entry matching to a restored contact event in the software application, which may be utilized to differentiate in the software application between a totally new contact and a restored one (as indicated in step 26). The software application may trigger the collection of ancillary information, such as the date/time and/or location of the device when the restoration event occurred, (as indicated in step 27), which may be stored in the synchronization log of software application in association with the modification event and pointed to the appropriate entry in the OS contact list (as indicated in step 28). Further, the software application may reassociate the previously held ancillary information for the deleted contact entry which was retained in the synchronization log so the full collection of ancillary information is properly associated rather than only ancillary information generated after the restoration event. Finally, the user may be presented with the contact entry which may be labeled as restored in step 29 in the software application. At a later time, if the user searches for the restored contact in the software application, it may provide a browsing interface for filtering all of a user's contacts based on parameters including the date/time and/or location when the contact was restored, as described further below.

In a further aspect of the present invention, a method for utilizing the software application for finding or searching for a contact entry may include searching the software application's synchronization log for a desired piece or type of ancillary information rather than searching for the contact entry in a more traditional manner, such as by searching the full contact list/address book for a name, phone number or other contact information. In some exemplary embodiments, the software application may include a search or sorting function of the contact list in the software application which has searching or sorting by date/time, location and/or type of modification event information which may be performed by a searching or sorting operation in the software application based on the synchronization log. The search of the synchronization log may then be utilized to organize or display particular contact entries via the pointers in the synchronization log to the appropriate contact entries in the OS contact list.

Figure 4:
FIG. 4 illustrates an example of a dashboard of the UI of the software application.
Figure 6:
FIG. 6 illustrates an example of a listing of new and edited contacts view of the software application.
Figure 6A:
FIG. 6a illustrates a detailed view of a single contact entry in the software application.
Figure 7:
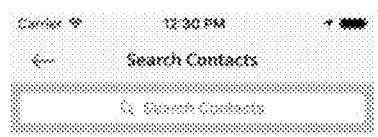
FIG. 7 illustrates a search prompt view of the software application.
Figure 5:
FIG. 5 illustrates an example of a phone book listing view of the software application.

FIG. 4 illustrates an example of a dashboard view of the UI of the software application in an embodiment of the present invention, which may include buttons to access different features, such as to show a list of new and edited contacts 101, which may display a listing of newly created and/or modified contact entries such as in FIG. 6, showing the full phone book list 102, which may display a full list of contact entries such as in FIG. 5, search contacts 103 to display a search field such as in FIG. 7 where common search items such as name, phone number, events by date, and/or locations recorded in the synchronization log, and/or deleted contacts list 104, among other buttons and/or controls. Further, when a contact entry is selected, a more detailed view may be displayed, such as in FIG. 6a, which may display common contact information along with more detailed items from the synchronization log, such as the dates/times/locations of creation or modification events. The various displays may also have indicators for available information, such as the location indicator 105 in FIG. 5, a creation date 106, a modified indicator 107 and/or a deleted entry indicator 108.

If editing contact information in the default or native contact application without having the application of the present invention running in the background, date and time information is synced or updated when the application software of the present invention opens and all contact logs which are added & modified with date & time is collected. However, if user deletes any contact prior to opening the application software of the present invention, then all the details of modified contact will not be available and only last deleted log information will be stored.

As noted above, the application software of the present invention will collect all information including time and date during syncing, whether editing is done with the application software of the present invention or the application software of the present invention is running in the background.

When the application software is running in the background during any editing or modification of contacts, the user has an option of whether or not to allow the location of the update be collected by the application software of the present invention. However, there is no option to deny permission for updating time and date as this defeats the purpose of having enhanced searching capabilities.

If desired, the application software of the present invention may also allow searching either based on the time and date of meeting the contact or when the contact information is updated or edited.

Though all contact information data may be stored in both the basic or native application and the application software of the present invention. The default or native app will contain limited information, whereas the application software of the present invention will contain the ancillary information including, for example, location information and created/updated date/time.

For contacts that existed before the application software of the present invention was installed, the ancillary data information collected does not affect the presentation of the contact in the native contact list just by the installation of the application software. Only the searching capabilities are enhanced. The application software of the present invention may display the creation date or last backup date (whichever may be most recent) of the contacts that existed before the installation of the application software of the present invention.

If a new contact was added using the application software of the present invention to the native contact list, one may choose to show that this new contact is added by a different application software at a certain date and time.

It may also be possible to use the application software of the present invention to indicate in the native contact list the original creation date for contacts that existed before installing the application software of the present invention. However, the location data is only stored and available in the application software of the present invention.

When searching a contact using the application software of the present invention, one needs not remember the name, as noted above. The enhanced capability allows for additional parameters such as time/date or location.

In some embodiments, the interface for retrieving contact information utilizing ancillary information may appear embedded inside another application via for example that application's exposed plug-in extensibility mechanism. In this way, the improved retrieval methods of the present invention may be leveraged by other applications that have an incidental need to retrieve contact information. For example, a text messaging application may be extended to allow chat participants to be chosen via the present invention's interface, allowing users to leverage ancillary information to retrieve contacts. In another example, a banking application may be extended to allow an account holder to choose a recipient for a money transfer via the present invention's interface. In another example, a calendaring application may be extended to allow someone scheduling a meeting to choose participants via the present invention's interface.

The application software of the present invention may also keep a detailed record of all retrievals and/or changes made to contacts in reverse chronological order, if desired. This information may also be stored in the New & Edited contacts area, along with a full list of deleted contacts that can be restored if deleted by accident.

Users of application software of the present invention may also be able to share the contact information in their profile with other users or non-users of the present invention through various wireless communication methods (e.g. text and email). Non-users may be invited to join when contact is shared.

While the invention has been particularly shown and described with reference to exemplary embodiments, it should be understood by those skilled in the art that changes in form and detail may be made therein without departing from the spirit and scope of the invention.

The invention claimed is:

1. A method for presenting contact information comprising:
providing a device-hosted contact list comprising a plurality of contact entries on a device comprising a computer that implements programming instructions;
submitting a query for an ancillary information related to at least one of said plurality of contact entries in a software application which is separately stored from said device-hosted contact list;
searching a record stored by said software application for said query, said record comprising a plurality of ancillary information associated with correlating contact entries by pointers, said record comprising a synchronization loci which stores change events that occur to said device-hosted contact list by appending additional information in said record without losing or deleting any stored information in response to said change events;
returning a listing of correlated contact entries where said ancillary information matches said query; and
presenting to a user said listing of correlated contact entries with links to corresponding contact entries in said device-hosted contact list;
wherein each of said ancillary information is an automatically retrieved contextual information which is stored separately from said device-hosted contact list in said record, corresponds to an event that occurred to one of said plurality of contact entries, is automatically appended to said record, and is selected from the group consisting of a meeting geolocation when said user encountered a contact in said contact entries, a meeting date when said user encountered said contact, a meeting time when said user encountered said contact, a creation time when said contact entry was created, a modification time when said contact entry was modified, and a deletion time when said contact entry was deleted.

2. The method of claim 1, wherein said device is selected from the group consisting of a mobile phone, tablet computer and personal computer.

3. The method of claim 1, wherein said query comprises a sorting operation.

4. The method of claim 1, wherein said ancillary information is collected during contact creation, contact augmentation, syncing or combinations thereof.

5. The method of claim 1, wherein said ancillary information comprises a location and is enhanced with more memorable location information.

6. The method of claim 5 wherein said more memorable information comprises birthday, anniversary, a holiday, an academic achievement, a professional achievement and a social gathering.

7. The method of claim 1, wherein said software application is utilized directly or run actively in parallel with said device-hosted contact list.

8. The method of claim 1, wherein contact entries are presented to the user as a result of said device being brought into the same or a similar environment as that captured within said ancillary information for at least one of said contact entries.

9. The method of claim 1, wherein contact entries are presented to the user as a result of said device being brought into the same or a similar environment as that captured within said ancillary information for at least one of said contact entries, said environment comprising a physical location.

10. The method of claim 1, wherein contact entries are presented to the user as a result of said device being brought into the same or a similar environment as that captured within said ancillary information for at least one of said contact entries, said environment comprising an ongoing event.

11. The method of claim 1, wherein said presenting to said user of said listing of correlated contact entries with links to corresponding contact entries in said device-hosted contact list adds additional ancillary information comprising the act of said presenting.

12. The method of claim 1, wherein interactions with said user are performed by a method selected from the group consisting of touchscreen interaction, keyboard interaction, mouse interaction, speech interaction and a combination thereof.

13. The method of claim 1, wherein interactions with said user are performed by said software application while embedded in or performed within another software application that utilizes contact information retrieval selected from the group consisting of a text messaging application, a calendar application, a banking application, a social media application and file sharing application.

14. The method of claim 1, further comprising updating said device-hosted contact list with said ancillary information by the user utilizing said ancillary information.

15. The method of claim 1, further comprising updating said device-hosted contact list with said ancillary information by the user utilizing said ancillary information to indicate a date for an event selected from the group consisting of a birthday, an anniversary, a holiday, an academic achievement, a professional achievement and a social gathering.

16. The method of claim 1, further comprising updating said device-hosted contact list with said ancillary information by the user utilizing said ancillary information to indicate a location for an event selected from the group consisting of a residence, a workplace, a social gathering, a landmark, a retail establishment, a public space and a private space.

17. The method of claim 1, wherein said user may consolidate multiple ancillary information into a single contact entry.

18. The method of claim 1, wherein said user is presented with multiple operations to manipulate contact entries simultaneously by presenting in a map, a timeline or a multiple-person interaction.

19. A method for managing an augmented contact list comprising:
    detecting with a software application a change in a device-hosted contact list of a device comprising a computer that implements programming instructions, said software application being installed or running on said device;
    identifying a type of change during an event and an associated contact entry of said device-hosted contact list from said change;
    automatically gathering ancillary information from said device within a timeframe of said change;
    automatically storing said ancillary information in a record maintained by said software application separately from said device-hosted contact list, said ancillary information being associated with said associated contact entry by a pointer in said record; and
    providing a query accepting mechanism to a user in said software application for searching said ancillary information and returning an identity of said associated contact entry;
    wherein said record comprises a synchronization log which stores change events that occur to said device-hosted contact list by appending additional information in said record without losing or deleting any stored information in response to said change events, and wherein each of said ancillary information is an automatically retrieved contextual information which is stored separately from said device-hosted contact list in said record, corresponds to an event that occurred to one of said plurality of contact entries, is automatically appended to said record, and is selected from the group consisting of a meeting geolocation when said user encountered a contact in said contact entries, a meeting date when said user encountered said contact, a meeting time when said user encountered said contact, a creation time when said contact entry was created, a modification time when said contact entry was modified, and a deletion time when said contact entry was deleted.

20. A method for presenting contact information comprising:
    providing a device comprising a computer that implements programming instructions in an environment with correlative relation to at least one contact in a device-hosted contact list on said device comprising a plurality of contact entries of a user;
    submitting a query for an ancillary information related to at least one of said plurality of contact entries in a software application which is stored separately from said device-hosted contact list in a location which is selected from the group consisting of separately on said device, on a cloud service, and on a remote storage;
    searching a record stored by said software application for said query, said record comprising a plurality of ancillary information associated with correlating contact entries by pointers, said record comprising a synchronization log which stores change events that occur to said device-hosted contact list by appending additional information in said record without losing or deleting any stored information in response to said change events;
    returning a listing of correlated contact entries where said ancillary information matches said query to said user; and
    presenting to said user said listing of correlated contact entries with links to corresponding contact entries in said device-hosted contact list;
    wherein each of said ancillary information corresponds to an event that occurred to one of said plurality of contact entries and is an automatically retrieved contextual information which is stored separately from said device-hosted contact list and is also automatically appended to said record and is selected from the group consisting of a meeting geolocation when said user encountered a contact in said contact entries, a meeting date when said user encountered said contact, a meeting time when said user encountered said contact, a creation time when said contact entry was created, a modification time when said contact entry was modified, and a deletion time when said contact entry was deleted.

* * * * *